US006826627B2

United States Patent
Sjollema et al.

(10) Patent No.: US 6,826,627 B2
(45) Date of Patent: Nov. 30, 2004

(54) DATA TRANSFORMATION ARCHITECTURE

(75) Inventors: Mark Sjollema, Hampton Hill (GB); Greg Odom, Grand Prairie, TX (US)

(73) Assignee: Burnbag, Ltd., Ballinakil (IE)

( * ) Notice: Subject to any disclaimer, the term of this patent is extended or adjusted under 35 U.S.C. 154(b) by 3 days.

(21) Appl. No.: 10/334,684

(22) Filed: Dec. 31, 2002

(65) Prior Publication Data

US 2004/0044792 A1 Mar. 4, 2004

Related U.S. Application Data

(60) Provisional application No. 60/408,096, filed on Sep. 3, 2002.

(51) Int. Cl.[7] ............................................... G06F 15/16
(52) U.S. Cl. ...................... 709/250; 709/223; 709/220; 709/238
(58) Field of Search ................................ 709/250, 220, 709/223, 227, 230, 238, 245, 246

(56) References Cited

U.S. PATENT DOCUMENTS

| | | |
|---|---|---|
| 4,649,533 A | 3/1987 | Chorley |
| 5,185,860 A | 2/1993 | Wu |
| 5,761,440 A | 6/1998 | De Marco |
| 5,968,133 A | 10/1999 | Latham |
| 6,009,103 A | 12/1999 | Woundy |
| 6,038,233 A | 3/2000 | Hamamoto |
| 6,219,707 B1 | 4/2001 | Gooderum |
| 6,243,751 B1 | 6/2001 | Chatterjee |
| 6,332,195 B1 | 12/2001 | Green |
| 6,425,008 B1 | 7/2002 | Lecheler |
| 6,560,642 B1 | 5/2003 | Nurmann |
| 6,564,257 B1 * | 5/2003 | Emens et al. ............... 709/219 |
| 6,590,861 B1 * | 7/2003 | Vepa et al. ................. 370/216 |
| 6,591,291 B1 * | 7/2003 | Gabber et al. ............. 709/206 |
| 6,591,306 B1 * | 7/2003 | Redlich ...................... 709/245 |
| 6,654,792 B1 * | 11/2003 | Verma et al. ............... 709/208 |
| 6,668,276 B1 * | 12/2003 | Ohkado et al. ............. 709/217 |

FOREIGN PATENT DOCUMENTS

| | | |
|---|---|---|
| WO | WO0167258 | 9/2001 |
| WO | WO02080491 | 10/2002 |

* cited by examiner

*Primary Examiner*—David Y. Eng
(74) *Attorney, Agent, or Firm*—Robert Groover; N. Elizabeth Pham; Groover & Holmes

(57) ABSTRACT

An architecture in which data outputs from an application program into a communication interface are diverted, by changing their address to a reserved address, and then are processed further by an added program which is invisible to the application program. The added program can provide authentication, privacy, data reformatting, or other such desired features to the data outputs without requiring it to be integrated with the application program.

112 Claims, 13 Drawing Sheets

DATA TRANSFORMATION ARCHITECTURE

CROSS-REFERENCE TO OTHER APPLICATION

This application claims priority from U.S. Provisional Application 60/408,096 filed Sep. 3, 2002, which is hereby incorporated by reference.

BACKGROUND AND SUMMARY OF THE INVENTION

The present application relates to computer architecture, and particularly to techniques for interfacing added modules into existing e-mail programs.

Background: Computer Communications

"Computer communications" was regarded as a specialized area in the 1960s or so, but now most communication is converging to a paradigm of data communication. The endpoints of data communication are not necessarily computers, but can be audio, video, or image interfaces, sensors, switches, control units, or many kinds of "smart" devices. Thus the established engineering principles of computer networks are becoming applicable to a wide range of applications.

Background: Networks, Packets, and Protocols

Computer network structure and operation is one of the basic areas of computer science, and a vast amount of literature has been published. One of the basic ways to structure communications over a network is to use packets of data, as in the pioneering "packet-switched" ARPANET which evolved into the Internet.

Background: Data Translations Generally

There are many types of transformations which can be useful to perform on a stream or packet of data. One very simple example is hashing. Another common example is encryption and decryption, where data is converted from a "plain" text (which can be read directly with the appropriate application to and from an encrypted text (which cannot be easily read without knowledge of the secret "key" data).

Background: Data Compression

In general, random (unpredictable) data cannot be compressed without loss of precision. However, many types of commonly-used data blocks are not perfectly random. To the extent that the data is not perfectly random, it can be compressed.

A wide variety of techniques have been developed for data compression. A popular, and very simple, algorithm achieves significant compression of any data stream which contains long chains of repeated bytes, and has the advantage that it will not produce a compressed output which is significantly longer than the input (as some algorithms will).

Compression does not have to be lossless, but can also be lossy. Many image compression algorithms do not permit the full original data to be recovered exactly, and such algorithms are not lossless.

Data compression can be particularly important when streaming video is sent over the Internet, as is increasingly common.

Background: Hashing

One of the simplest types of data translation is "hashing," where data is reversibly transformed in a way which randomizes the statistical distribution of bytes. Hashing can be a useful way to disarm viruses and/or provide a more nearly stochastic distribution of data. (Equalizing symbol distribution can help in increasing S/N ratio of data transmission.)

Background: Filtering

A special kind of data translation is filtering, where data is transformed conditionally depending on a certain test. "Packet filtering" is a more specific term for content-dependent routing. Any router performs address-dependent routing, but filtering implies that the data in the packet is analyzed in some fashion to affect routing. (For example, packets in which a virus signature is found may be discarded.)

Background: Digital Signature and Identification

Public-key algorithms (RSA etc.) can be useful for authenticating digital documents. An extension of this is for identification of the specific human who has chosen to authenticate the document. There are many circumstances where it would be useful for persons communicating over the Internet (or over a network) to be able to identify themselves reliably. For example, in arm's-length Internet sales, it can be useful to definitely identify the other party. For another example, electronic publishing over the internet becomes much more practical if working access can be limited to only those users who have paid for it. For another example, some users would like to filter incoming email to exclude mailings (such as spam) which are not tagged with a reliable certificate of origin.

Keys used for digital signatures are a very long series of bits, which can be represented as long series of alphanumeric characters. Unlike Personal Identification Numbers (PINs), it is simply not feasible for individuals to remember them. For access control, such key data is typically stored in a chip (or other electronic memory), which can be embedded in a plastic card, or in another physical object such as a ring.

Background: Interfacing to Programs

In the past decade it has become increasingly difficult to introduce innovative business software products for the personal computer market. Such products must be able to interface to the widely used software application packages, and this is not always easy. In particular, it is important for communications-related software to be able to interface to Outlook, Notes, and GroupWise, and none of these are easy to program for. (The documentation provided to third-party developers is unclear and difficult to use.)

Computer communications are a somewhat unusual area of software development, in that many functions may need to be combined. A user's full-range email program should be able to handle (using calls to other programs as needed) various compression or authentication formats, various image formats, various audio formats, various HTML or XTML extensions, various drawing formats, various special fonts, virus-checking, and other new functions as they come up. (For example, the secure communications capabilities of PGP were integrated into some email programs, such as Eudora, long before PGP was available in other email programs.) As this list indicates, the boundary between browser functions and email functions has blurred somewhat in the last decade, and this trend may continue. Thus, since email handling necessarily involves so many different data types and data operations, smooth integration is particularly important.

Background: Dongles

A recurrent theme in the software industry has been the desire to find some way to make copied software unusable. One of the earliest ways to do this was the "dongle," in which a physical package containing an electronic key was attached to a port of the computer.

Data Translation Architecture

The present application describes a new system architecture for adding in functionality, and particularly for adding data translation functions between a communications program and its target (e.g. the outside world). The preferred embodiment achieves this without any need to intrude on management of the TCP/IP stack; instead, data for communication is simply addressed to a reserved (preferably loopback) address, and is snooped by a "translation agent" (software routine or hardware) either when it is being sent to the network interface unit or when it is echoed back. The translation agent can provide authentication, privacy, data reformatting, or other such functions. In alternative embodiments these ideas can be used in digital systems which are not computers, or can be used as part of a firewall or gateway, or to interface between networks using different protocols, or used in other analogous ways.

The disclosed innovations, in various embodiments, provide one or more of at least the following advantages:

simple interface into existing software;
added IP address uses without added stack handling;
good invisibility to viruses;
easy integration, even with undocumented e-mail programs;
can secure all non-protocol-level data on any TCP/IP port;
transparent to applications which use TCP/IP;
device, platform and operating system independent;
independent of any specific methodology for securing data;
recipient-dependent email modifications are easy.

BRIEF DESCRIPTION OF THE DRAWING

The disclosed inventions will be described with reference to the accompanying drawings, which show important sample embodiments of the invention and which are incorporated in the specification hereof by reference, wherein.

DETAILED DESCRIPTION OF THE PREFERRED EMBODIMENTS

The numerous innovative teachings of the present application will be described with particular reference to the presently preferred embodiment (by way of example, and not of limitation).

Translation Agent (TA) is an architecture for modifying (e.g. securing data in the Telecommunications Control Protocol and Internet Protocol (TCP/IP) data stream). TA is platform, operating system and device independent. TA is independent of any specific technology for securing or otherwise modifying the data.

TA utilizes the TCP/IP "loopback" address 127.0.0.2 and/or other class A addresses in that range to implement a procedure whereby TA can become a pseudo-server on and within the physical device.

TA is then able to monitor all or specific ports on the device and secure the data as it is transmitted or unsecure the data as received.

TA is independent of specific protocols such as SMTP ("Simple Mail Transport Protocol"), POP3 ("Post Office Protocol 3"), FTP, HTTP etc. TA examines the data, passing protocol level information without modification and secures the data portion of the transmission.

TA processes and secures the data based on the requirements and capabilities of the specific method used for securing the data.

TA is designed to be transparent to other applications and virus checking applications.

The TA architecture provides an open framework into which many different algorithm implementations can be inserted as modules. For example, for converting unsecured data to secure data and vice versa, the TA architecture can support insertion of e.g. LZW, DES, DES-3, Rijndael, Blowfish, TwoFish, PGP, RSA, etc. Algorithms used can be, for example, streaming or block-oriented, symmetric or asymmetric.

The Translation Agent architecture is modular to the extent that a wide variety of existing encryption (or other) algorithms can be "plugged in" to the Translation Agent. This means that any existing or later-developed algorithm or system can be used if any sizeable group of users demands it. The amount of administrative overhead created by these systems is reduced, since the activities performed within the Translation Agent module are unseen by the user. This is particularly beneficial in corporate IT departments, where a considerable amount of support is usually necessary to make this systems function properly.

Figure 1:
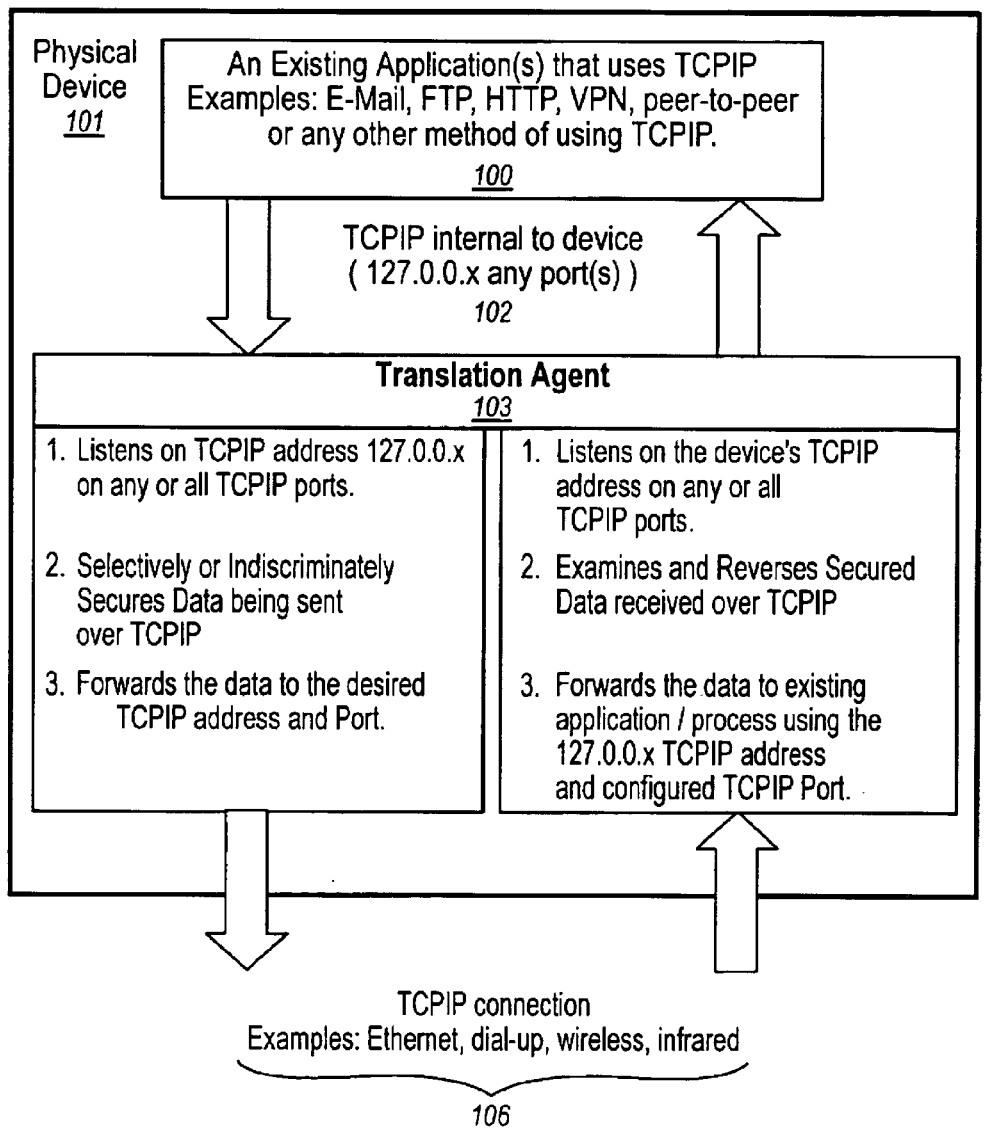
FIG. 1 shows a generic overview of the translation-assistant.

FIG. 1 shows a generic overview of the TA's function in a device 101 using TCP/IP. (The device 101 can be, for example, a personal computer, or alternatively can be a variety of other device types as discussed below.) The configuration of a software application 100 is modified to send and/or receive TCP/IP packets using a reserved (e.g. "loopback") TCP/IP address 102 in place of its original TCP/IP settings. TA module 103 is configured to listen on the reserved address 102 specified for this application. (Note that multiple reserved addresses can be specified for multiple applications.) TA module 103 then initiates sessions, using the application's data, on another TCP/IP connection 106. (The TA module 103 retains the application's original TCP/IP address and Port configuration data, in order to transmit and receive the data.) For widely used applications, configuring the application settings would be an automated installation process. In most cases, modifications or enhancements by the application vendors should not be required.

As denoted in FIG. 1, the configuration for the application 100 is changed to use the "loopback" address 102, and TA will then communicate with the application 100 as though TA were the intended destination. TA 103 will examine and modify the data as necessary, and will forward the modified (e.g. secured) data to the intended destination through connection 106. In the other direction, TA 103 will receive data for the application 100 from connection 106, examine the data and unsecure it when necessary, and forward it to the application 100 through connection 102. Thus TA 103 allows the application 100 to be secure in transmitting and receiving its data without modification to the application's software.

Sample Implementation: SMTP/POP3 E-Mail Client Interface

Figure 2:
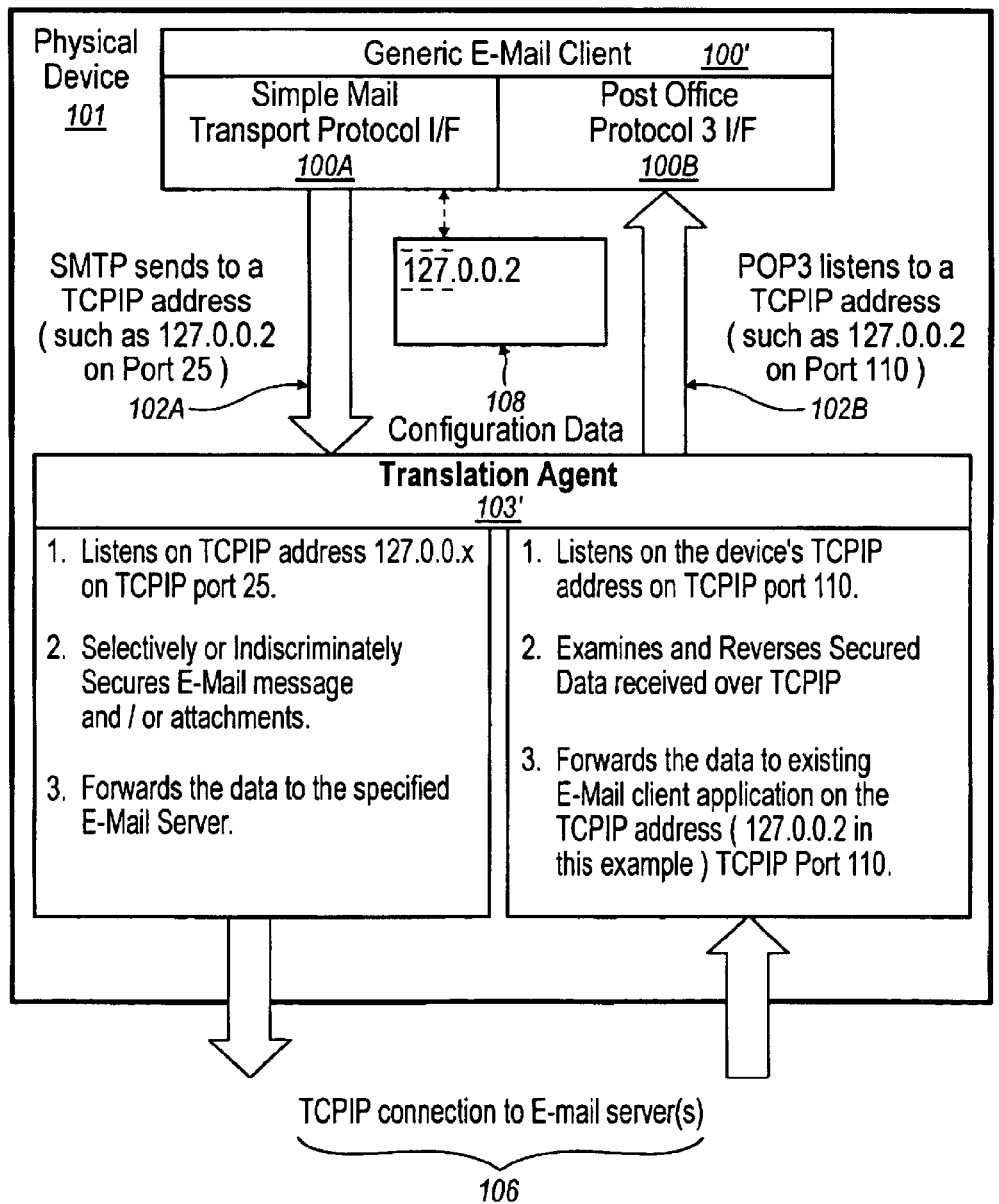
FIG. 2 shows an example of implementation of the Translation Agent into an existing application environment.

FIG. 2 is a more specific example of implementing TA into an existing application environment. Again, the example shown is based on a device 101, e.g. a personal computer or PDA, with TCP/IP connectivity. The E-Mail client 100' in this example is reconfigured so that its SMTP/POP3 interfaces send and receive on the "loopback" TCP/IP address 127.0.0.2. Specifically, the SMTP target address saved (with many other parameters) in system configuration data file 108 (e.g. a Windows registry file) has been changed to 127.0.0.2, and the POP3 address has also been changed to 127.0.0.2.

In this example the TA module 103' listens on 127.0.0.2 on the "Well known" port 25. When the SMTP interface 100A sends an E-Mail message and/or attachments, TA 103' intercepts the messages.

The protocol level data is preferably passed through intact, but the message content (indicated by the appropriate SMTP body tags etc.) can be transformed by the TA module 103'. That is, the TA module 103' preferably "parses" the SMTP transmission, to the limited extent needed to identify the message body and/or attachments, and then (depending on is programming) performs a data translation operation on these portions. The possibly-transformed body and attachment data, combined with the untransformed protocol data, is then sent along, through connection 106, to the SMTP server that was originally specified by the application.

Correspondingly, the TA module 103' will listen on the reserved address (in this example 127.0.0.2 on Port 110) for the application to initiate a POP3 session. Thereafter TA 222 will monitor the session, and if secured data is encountered for this application/user, then the TA module 222 will unsecure the data. Otherwise the TA module 103' can simply pass the clear data through to the POP3 interface 100B.

Both the SMTP and POP3 data securing and unsecuring processing are transparent to the application and virus scans implemented at the device.

Installation of TA

Figure 13:
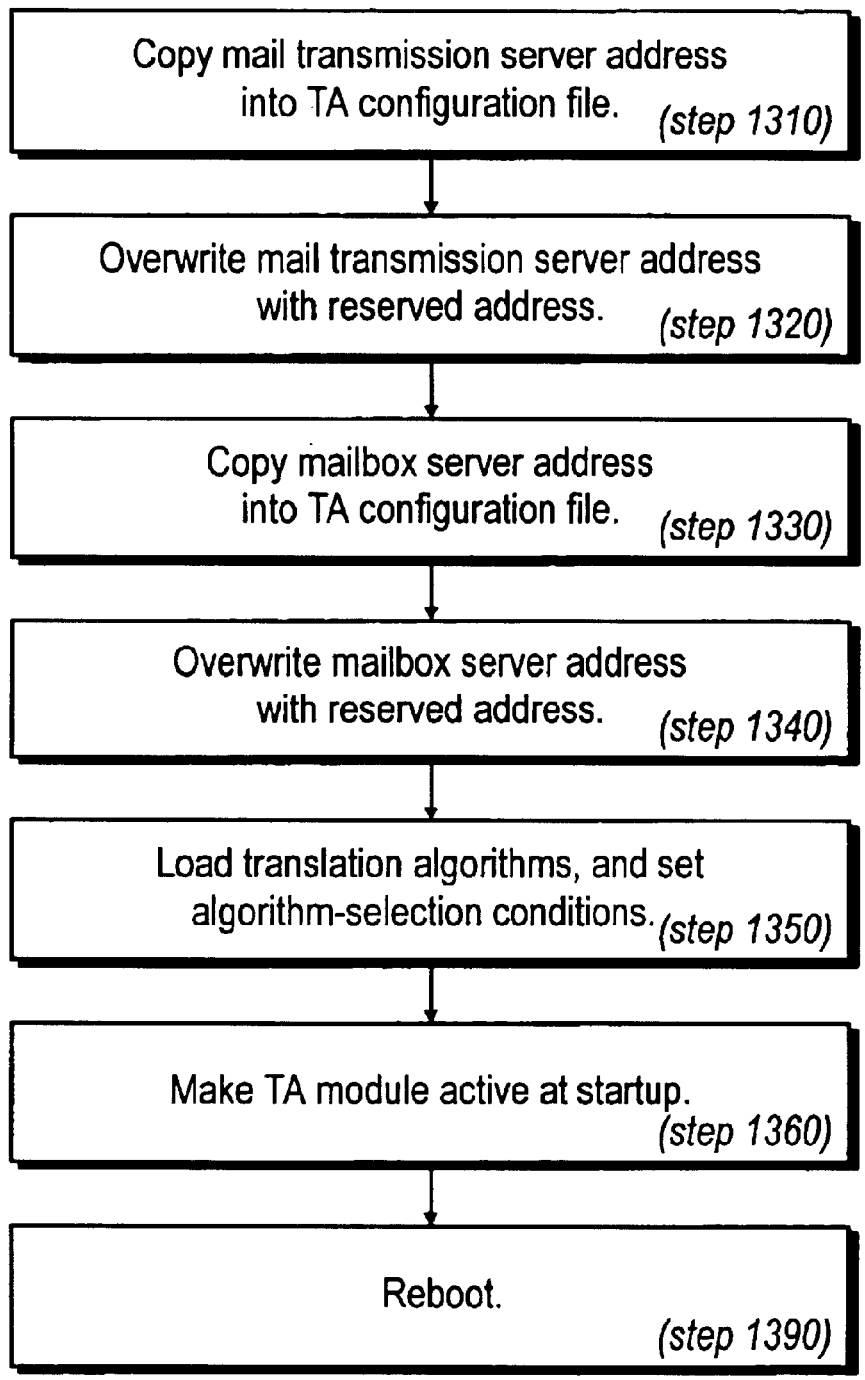
FIG. 13 gives an overview of the installation process.

FIG. 13 gives an overview of the installation process (which, as noted, is preferably automatic.) In the presently preferred embodiment, TA (or its installation program) initially examines the windows registry 108 for e-mail client configurations. (The actual entry locations and data will vary depending on the versions of the E-Mail client and possibly the Windows operating system.) TA extracts the client configuration (steps 1310 and 1330) and saves the information in its own configuration file.

TA (or the installation program) then updates the windows registry 108 with POP3 (step 1340) and SMTP (step 1320) configurations set to a reserved address, e.g. a loopback address 127.0.0.x.

The TA module is then configured (step 1360) with logical relations which will cause it to load whatever translation algorithms are desired. (For example, hashing might be used for outbound messages to some addresses, or encryption for others.)

Once the TA module itself has been set up to launch automatically, the unit can be restarted (step 1390).

TA then starts a listening function for POP3 and SMTP on the loopback address at the well known ports for POP3 and SMTP.

When the e-mail client starts, it obtains the e-mail server configuration from the windows registry, and is not aware of the changes made by TA.

When the e-mail client initiates a POP3 or SMTP request, it actually connects with TA on the same device.

TA then initiates the same type connection with the actual POP3 or SMTP server.

TA then monitors the information, receiving from the e-mail client and forwarding to the server and visa versa.

If e-mail is being sent (SMTP), then TA looks for the recipient information, both primary and carbon copies. If any recipients are in the list of registered secured recipients for the encryption technology implemented then TA will wait for the actual text and attachments and secure the information. If there are no secure recipients then TA simply continues to pass the information.

If a POP3 session is initiated then TA simply checks the information to determine if it is in a secure format, and unsecures the information if necessary, before passing it to the e-mail client. If TA is not able to decrypt the information, e.g. because the recipient is not the authorized recipient, then the information is passed to the email client in its as-received format.

When TA is uninstalled, the uninstallation program preferably resets the registry entries back to their original configuration.

Preferably, TA performs a test for integrity at startup. (For example, a checksum derived from the updated registry entries can be stored where TA can read it and check it.)

The same general interface should function for Lotus Notes and IMAP with minor changes for these protocols.

The example refers to the windows registry, but the specific client application may use some other form for saving its configuration information, such as an ".ini" file, and in this case the minimal access to registry described above is merely performed on the appropriate .ini file or other location.

Non-E-Mail Applications

Figure 3:
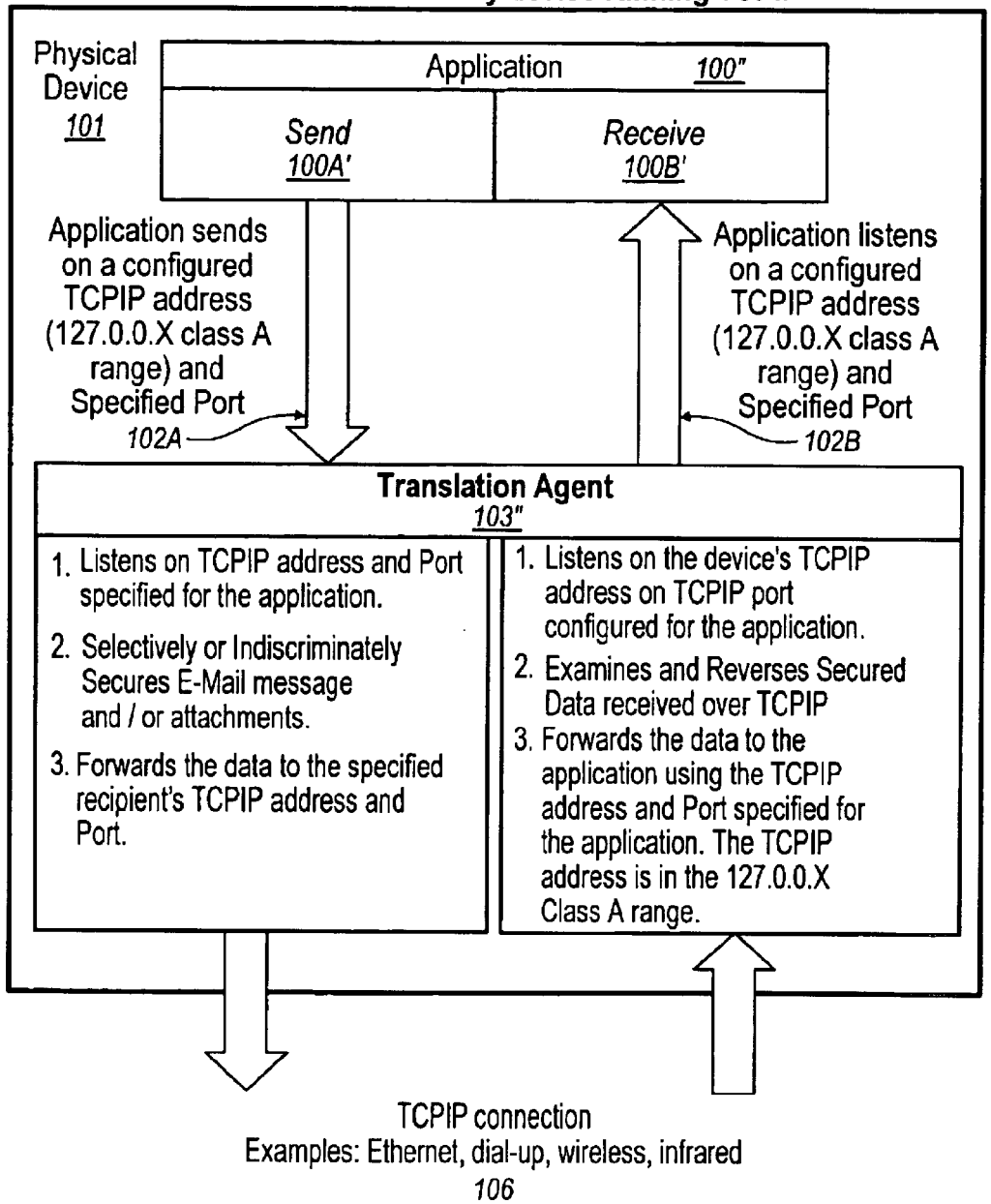
FIG. 3 shows a generic TCP/IP session.

FIG. 3 shows a generic TCP/IP session with a non-email application 100", which can include but is not limited to FTP, VPN, HTTP, video conferencing and peer-to-peer applications. By configuring the application 100" to send and receive using the "loopback" addressing scheme, TA is able to secure an application's data without modification to the application's software. TA can secure all data or selected data based on configuration parameters. TA can be configured using its secured configuration manager to use a different TCP/IP port on the device or for the destination.

TA's mechanics of operation in this configuration are similar to those of the e-mail configuration of FIG. 2. The application's configuration data is preferably altered so that its send routines 100A' use a non-routable address 102A (preferably a loopback address), and its receive routines 100B' use a non-routable address 102B (also preferably a loopback address). The translation agent 103" is set up to capture accesses to these reserved addresses, and to perform data translation operations on the content of the transmissions as described above. Note however that the retransmission functions performed by translation agent 103" can be slightly more complicated than those performed by email translation agent 103', since the ultimate target address is not necessarily static. Where the target address is unpredictable (as in http: or ftp: accesses), the TA 103" is preferably configured either to snoop and divert all communications, or else to access dynamic routing data from inside the application 100".

Secure Communication to Interdicting Server

Figure 4:
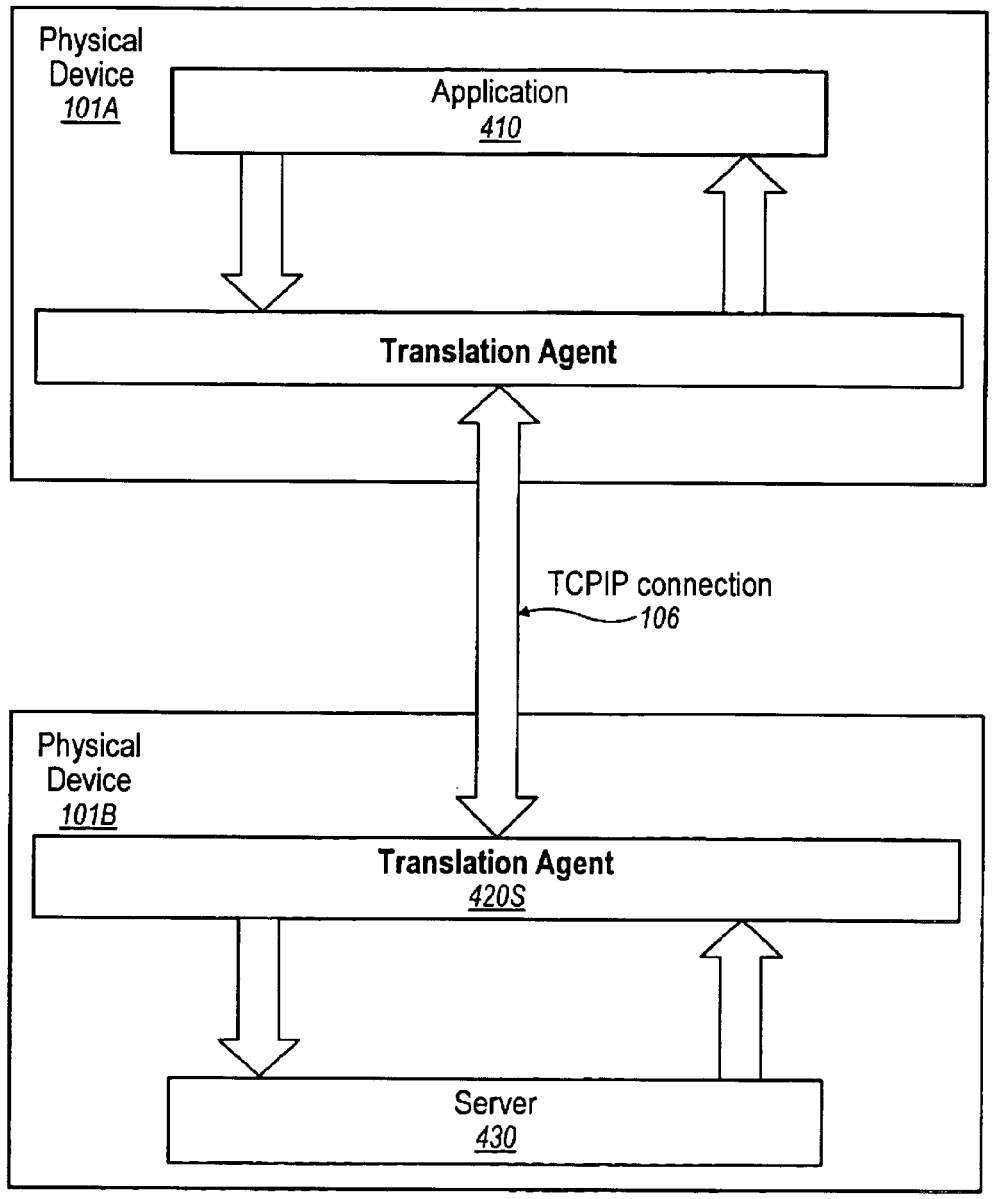
FIG. 4 shows a client server environment using some of the disclosed inventions.

FIG. 4 shows a sample implementation in a client-server environment whereby the Server requires the data to be unsecured upon arrival. In this example an application 410, running on a physical device 101A (e.g. a workstation), is backed up by a local TA 420A which secures some or all of the communications over connection 106 (e.g. a LAN or WAN routing). A corresponding server-side TA 420S provides a complementary data translation interface between channel 106S and a server 430. An example of this environment could be organization with a central E-Mail server where the client 410 secures all data to the server (in this case E-Mail messages and attachments), and the E-Mail server 430 unsecures the data to perform a Server level virus scan.

Figure 7:
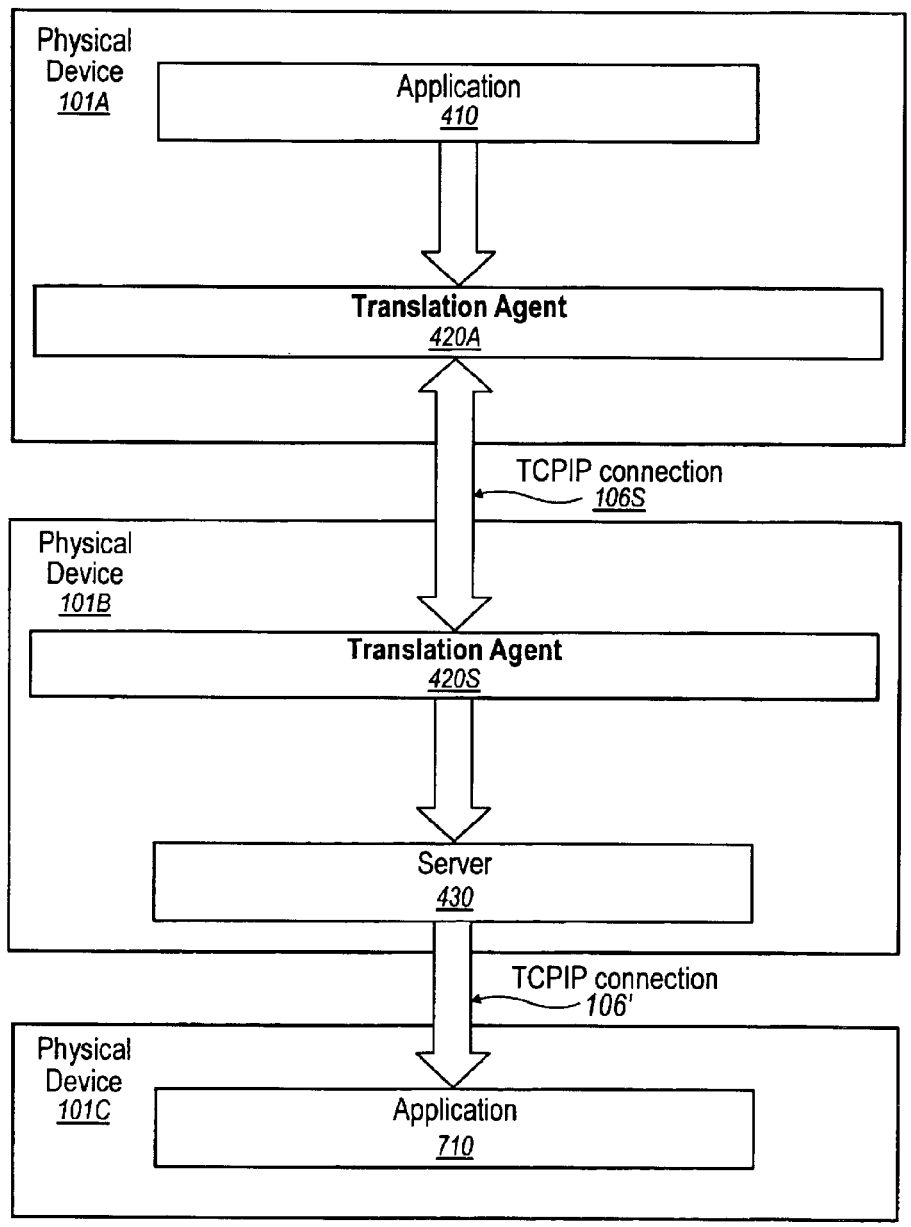
FIG. 7 shows the client to server secure relationship.

The reverse process can also be employed, where the client 410 only receives data that has been secured by the Server even when the originator did not have the capability. An example of this is shown in FIG. 7, where an application 710 on a remote device 101C can communicate with the application 410, but all communication must be routed through client-server channel 106S which is protected by TA modules 420A and 420S. Thus in this example the server 430 can be programmed (for example) to perform firewall and gateway functions needed for interface to the outside world.

Figure 8:
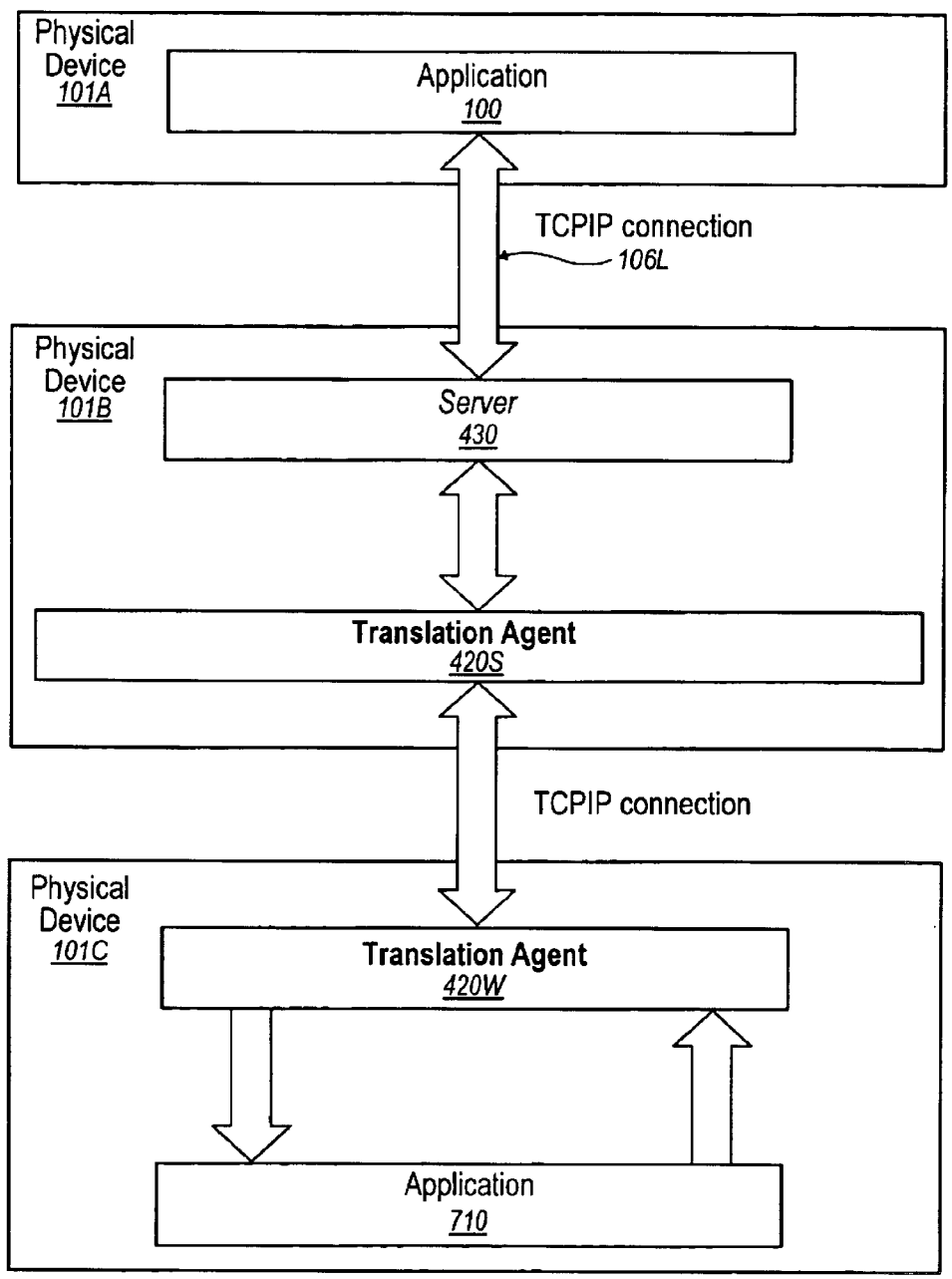
FIG. 8 shows the server to client relationship.

FIG. 8 shows a different implementation, where client-server communications over local channel 106L are not necessarily mediated by TA modules, but communications which must pass over a more exposed channel 106W are secured by TA modules 420A and 420S. Note that this diagram is very similar to FIG. 4, except that the channel assignments are different; in the embodiment of FIG. 8 the local network is assumed to be protected by (e.g.) physical security precautions, and the problem addressed is that of providing secure communications with remote workstations.

Peer-to-Peer Implementations

Figure 6:
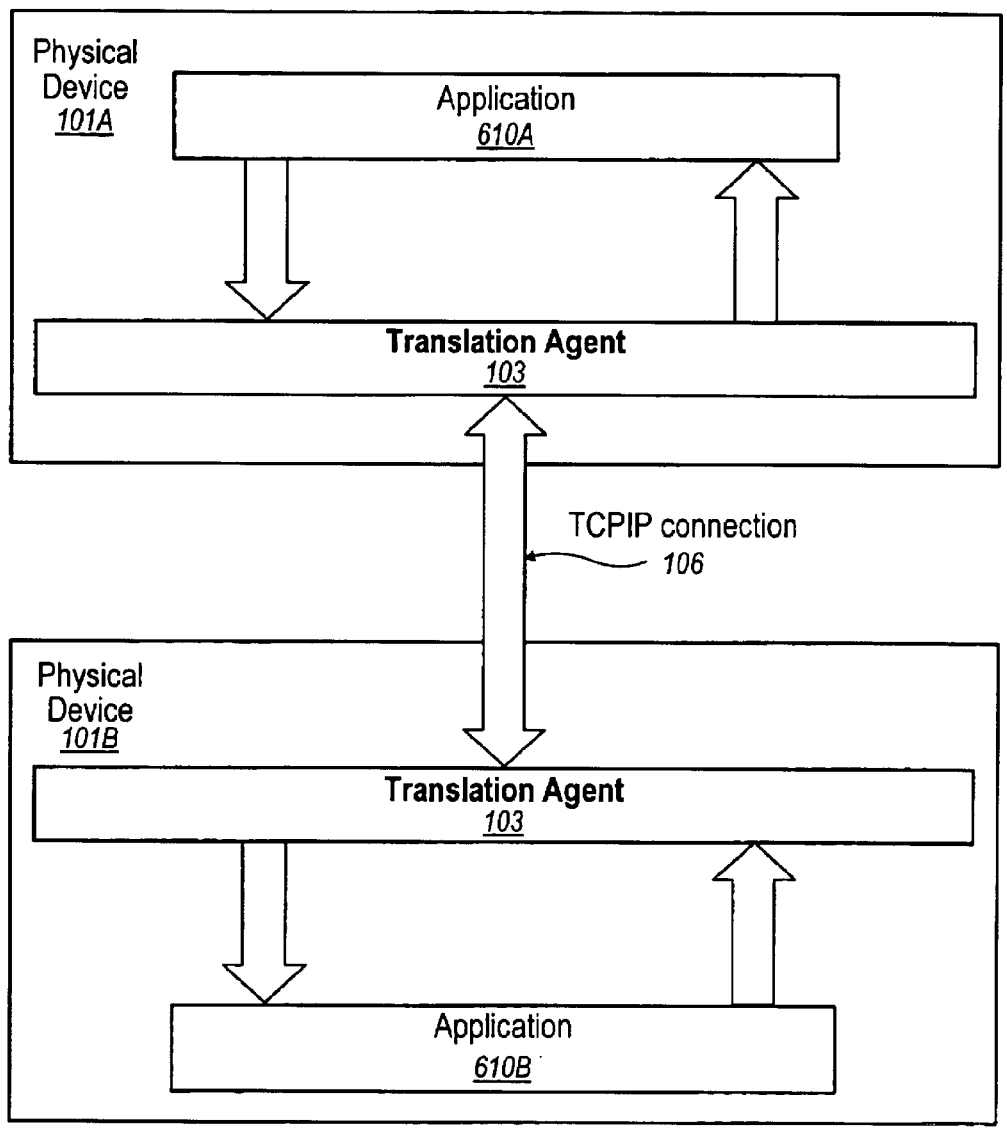
FIG. 6 shows secure data transmission in a peer-to-peer environment.

FIG. 6 shows an example where data transmission can also be secured in a peer-to-peer environment. In this example processes 610A and 610B, running on two different physical devices 10A and 10B, have their communications mediated by the complementary operations of respective translation agents 103. Note again that the physical devices 101 do not have to be computers, but can be, for example, components of a computing system. Thus, for example, in a large computing system which uses an array of asynchronous processors to form a "compute farm," or an array of storage devices to form a "server farm," the TA modules can be added in to modify peer-to-peer communications. Note, however, that this modification is not as attractive for applications where latency in communications is an action.

Figure 5:
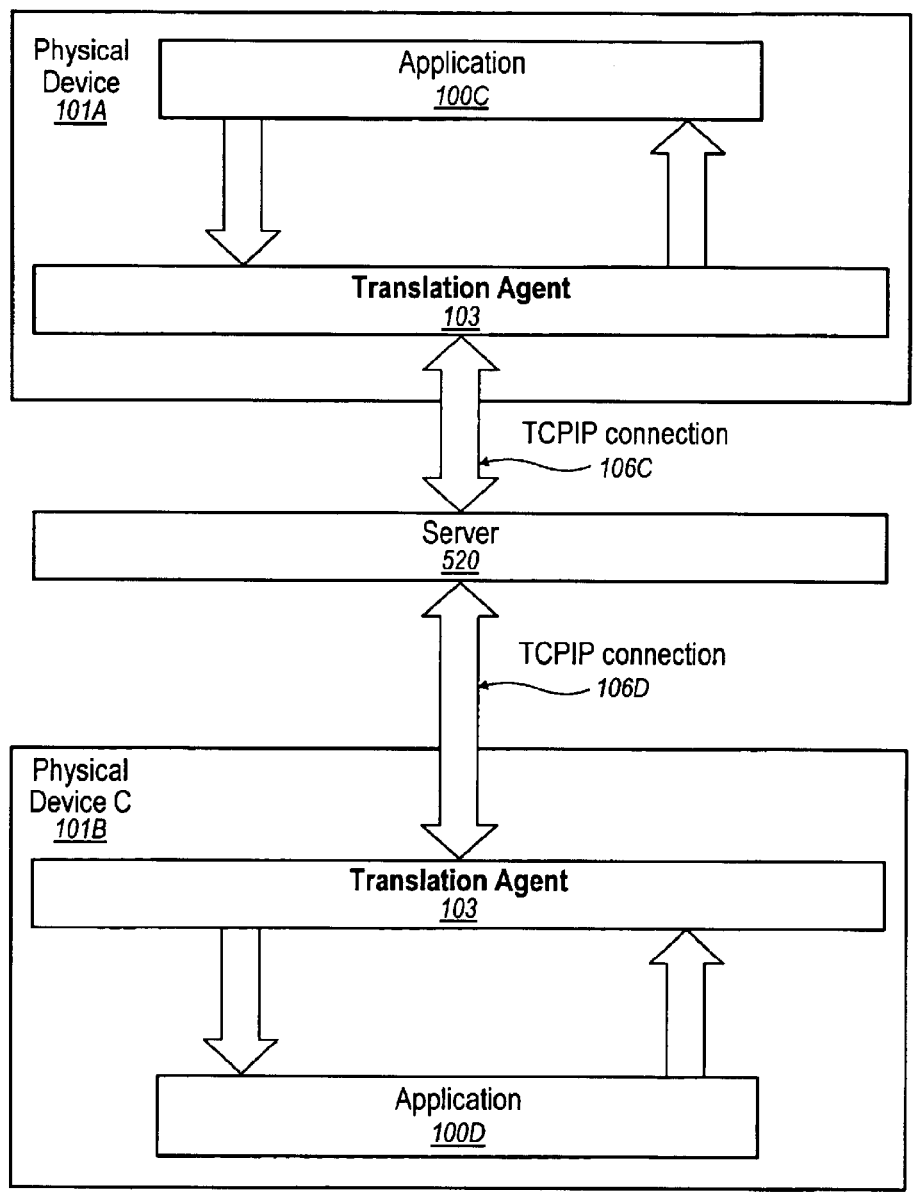
FIG. 5 shows an environment whereby TA secures the transmission between two TA client applications without Server interdiction.

FIG. 5. shows a different version of this, where a server 520 links one subnetwork 106C, on which an application 100C is running on a physical device 101A, to another subnetwork 106D, on which another application 100D is running on a physical device 101B. The complementary operations performed by the TA modules 103 do not disturb routability, but can be used, as described above, for symbol equalization, hashing, or encryption/decryption operations.

Sample Software Implementation of Translation agent

Figure 9:
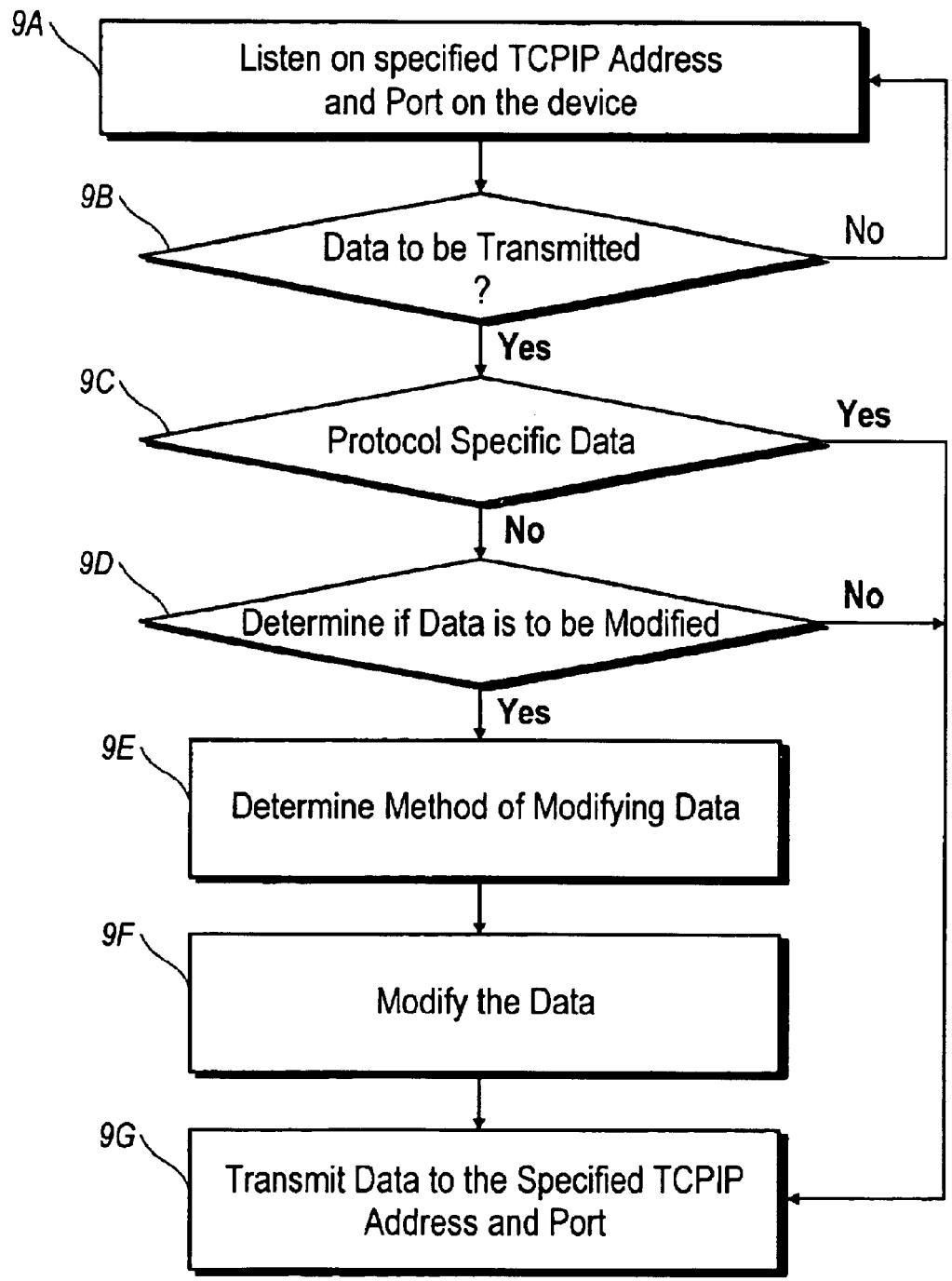
FIG. 9 is a flowchart for the TA examining and processing for transmitting data.
Figure 10:
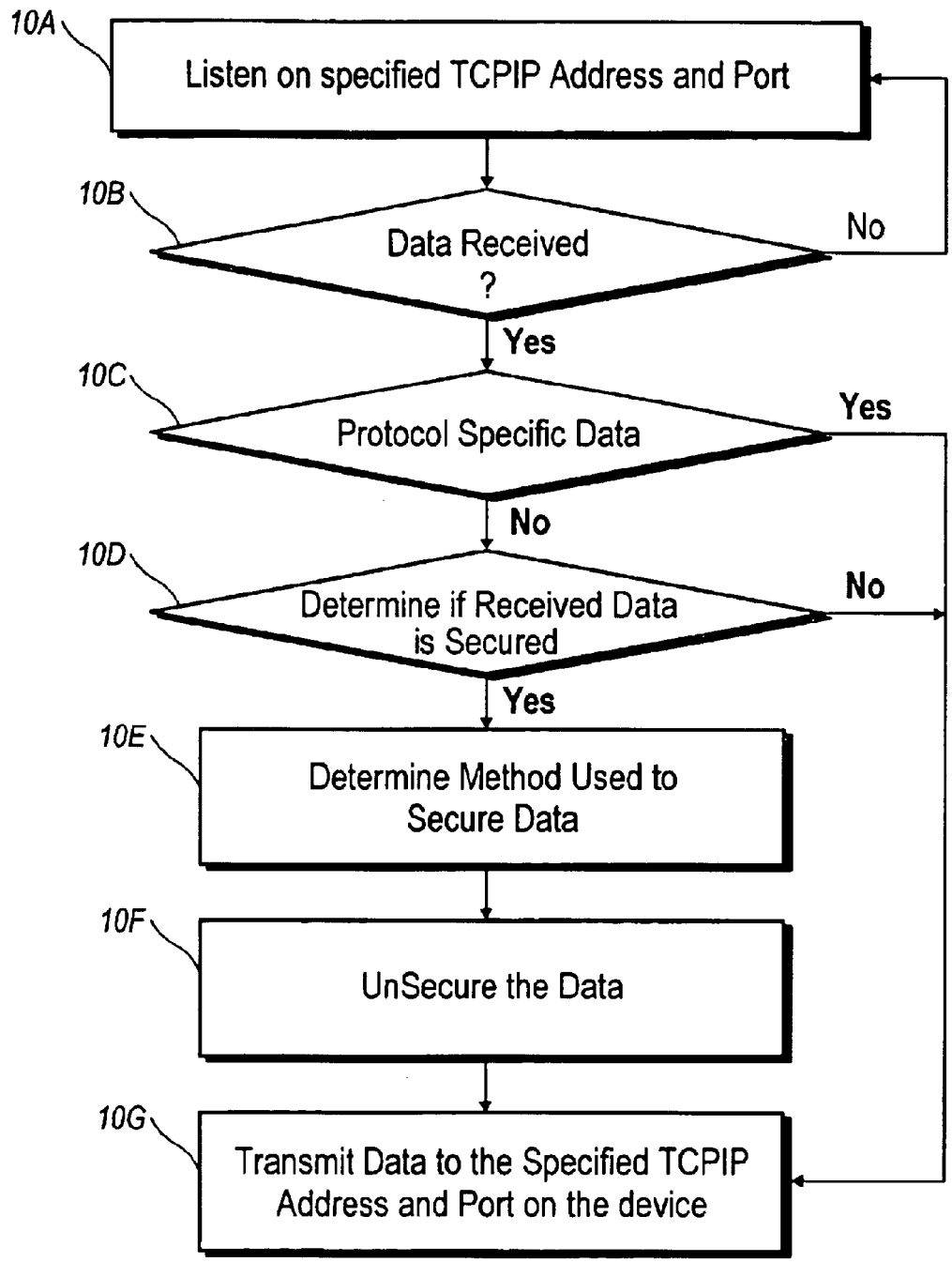
FIG. 10 is a flowchart for the TA examining and processing of received data.

FIGS. 9 and 10 are a complementary pair of flow charts which show an example of implementation of the Translation Agent module in software.

FIG. 9 shows how the TA, in this sample embodiment, handles data transmitted by an application (to a reserved address).

Initially the TA routine simply listens to a particular address and port for transmissions by the application program (state 9A), and loops in this state until matched incoming data is detected (branch 9B).

When matched incoming data is detected, the protocol portion of it is extracted for unmodified retransmission (branch 9C). If data translation is conditional (which it may not be), the logical evaluations are done to see whether data modification is to be performed (branch 9D). (Note that test 9D can be performed before or after test 9C.) If data modification is to be performed, step 9E determines what subroutines are to be called for securing or otherwise translating the data, and step 9F calls the appropriate subroutines (typically third-party modules). Finally (step 9G), the reassembled packet (e.g. unmodified header plus modified body and attachments) is transmitted on to an external address.

FIG. 10 shows how the TA, in this sample embodiment, handles inbound data for an application. This example shows the particular case when TA is used for decryption, but of course similar testing and translation operations would apple to other uses of TA.

Initially the TA routine simply listens for transmissions to a particular address and port (state 10A), and loops in this state until matched incoming data is detected (branch 10B).

When matched incoming data is detected, the protocol portion of it is extracted for unmodified retransmission (branch 10C).

The data portion of the packet is then tested to see whether it has been secured (branch 10D), and if so the application then determines what algorithm or algorithms must be called to unsecure the data (step 10E). The appropriate program calls are then made (step 10F), and the modified data, plus the unmodified protocol-related header, are then transmitted to the IP address and port being watched by the application.

Software Interface with Translation Agent

Figure 12:
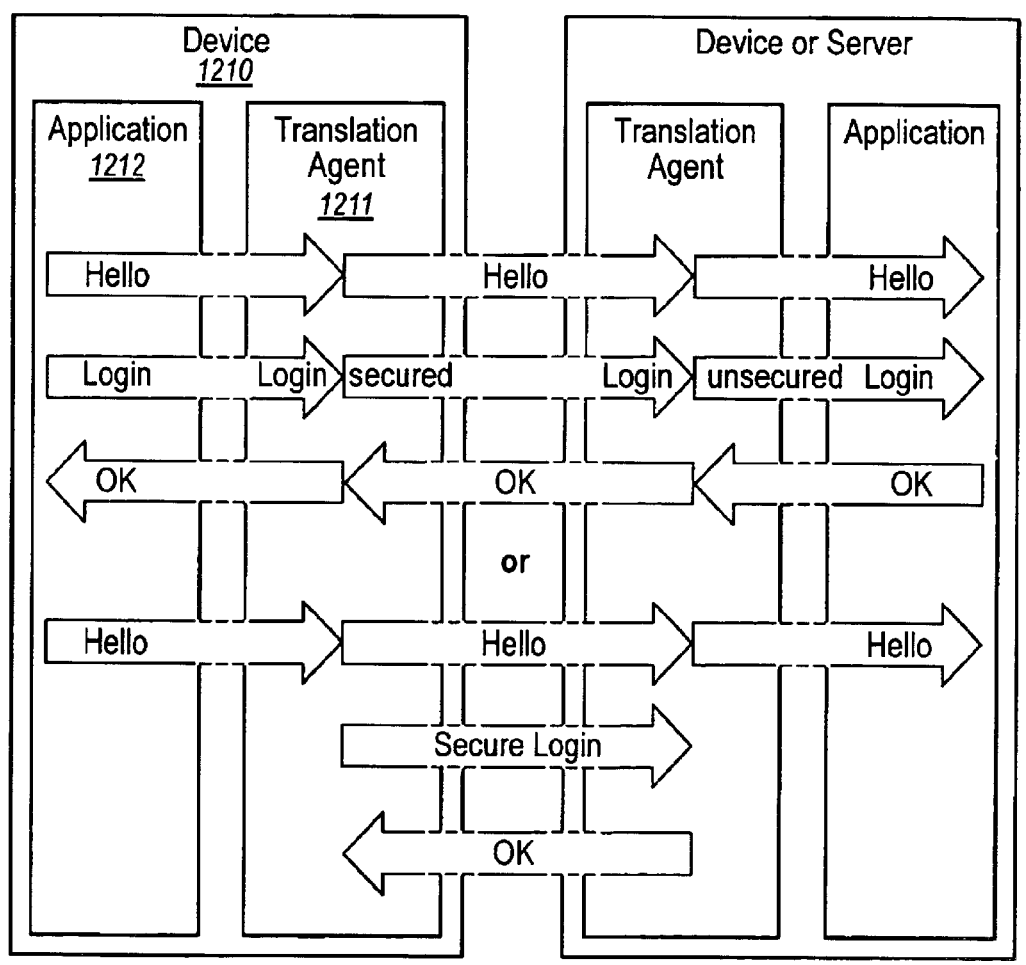
FIG. 12 illustrates the interface between Translation Agent and application software in a device.

FIG. 12 illustrates the interface between Translation Agent and application software in a device.

TA does not interface directly with any application software. The interface is through a loopback address with TCP/IP.

In the communications loop, the application simply continues to communicate with other devices using the TCP/IP interface. TA intercepts the transmission within the device and takes the appropriate action.

If TA is used to secure information within a device then the same loop interface exists, but TA loops the transmission back to the application after having taken the appropriate action (encrypt or decrypt).

The arrows on the document are meant to show flow of the information. In actuality the information is normally a two way exchange over the one connection between the software. In other words the application probably sends and receives over one TCP/IP connection for one function and likewise TA sends and receives over the one connection.

Adaptation to Mobile Systems

Figure 11:
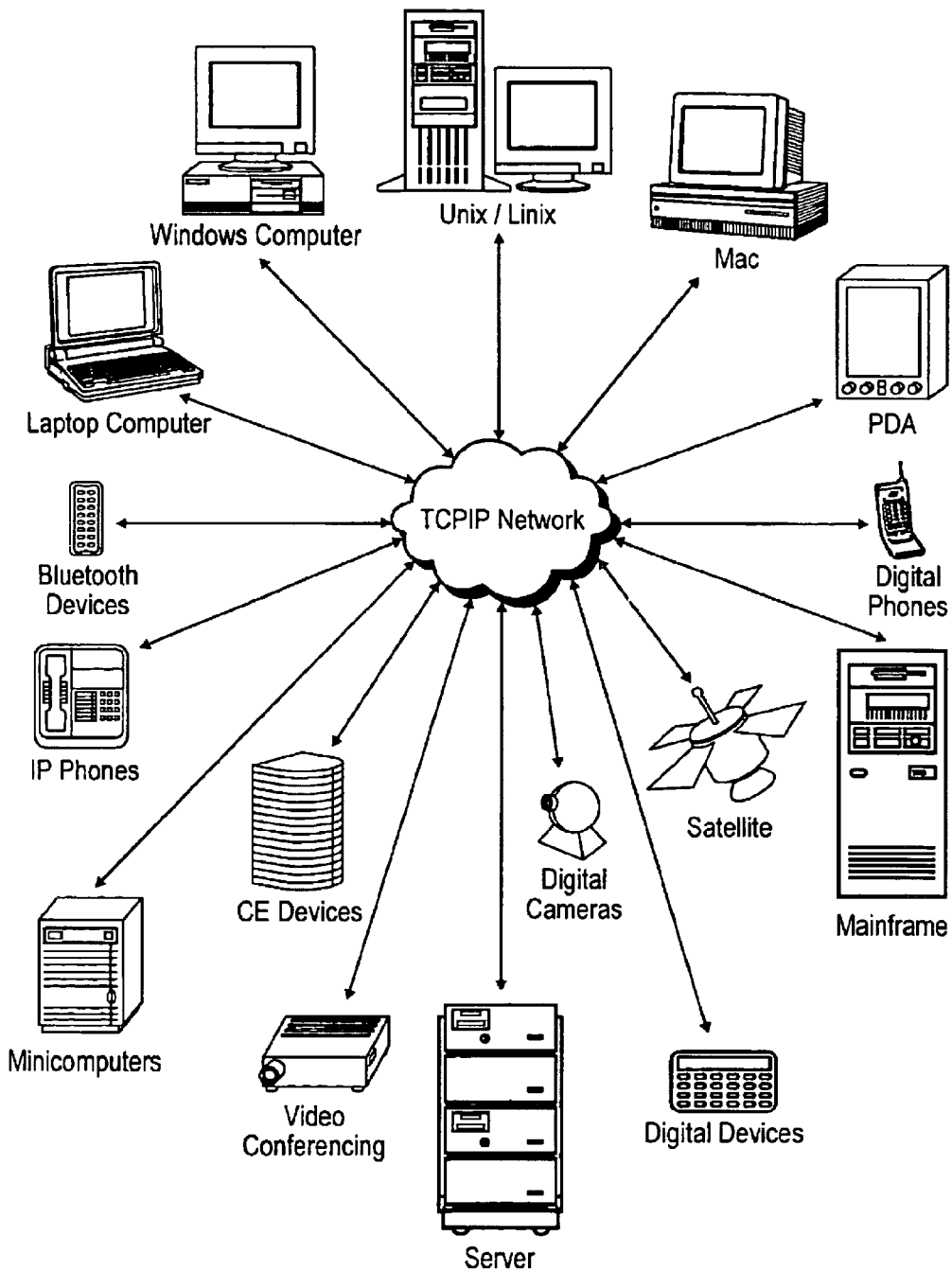
FIG. 11 is a sample of the devices that can be secured with TA.

FIG. 11 is a sample of the devices that can achieve secure communication, using the TA, through the Internet (or other large network). This diagram is not an exhaustive list at all, but does give some idea of the range of applications of TA technology. The illustrated devices, which can be connected through the Internet or some other TCP/IP or analogous network, include without limitation: Windows™ computers; Unix/Linux computers; MacIntosh™ computers; PDA devices; digital cell phones; other digital devices; mainframe computers; servers; videoconferencing stations; Windows-CE™ devices; minicomputers; IP telephones; Bluetooth devices; satellites; digital cameras; and laptop or notebook computers.

A particularly attractive contemplated use of the disclosed inventions is in handheld mobile internet devices. Such devices (such as the Blackberry, or other SIM-enabled PDAs) are increasingly coming to include substantial memory and processing power, and are often designed for easy installation of software applications and accessories. It is contemplated that the modular add-on capability of a "translation agent" as described above can be particularly advantageous for updating such systems to include user-selected translation operations as described above.

The Blackberry, for example, uses a Java™ operating system, and therefore the above functionality implies a slight modification to the "JVM" (the "Java Virtual Machine," which any Java-capable computer must be able to emulate). That is, Java instructions are assumed to be executed by the Java virtual machine, and any particular computer must be equipped with software drivers to implement the JVM. Typically Java midlets sit on the Blackberry to perform encryption and related functions.

XDA is a competitor to Blackberry, which uses Windows CE, and the disclosed inventions can be similarly adapted to the XDA.

Other implementations (in Java, embedded Linux, PalmOS, or other system software) can similarly be ported to Epoc or other machines, including but not limited to any "3G" or "2.5G" phone.

In the special case of routing e-mail into PDAs (or telephones or other mobile information appliances), the TA can also be set up for formatting functions, e.g. for selective stripping of attachments and/or images. This function is a normal part of low-bandwidth wide-area wireless network communication, but the ability to include it in the TA, where it is performed transparently to the devices and applications involved, provides a new capability.

Two-Translation-Agent Methods

In one class of embodiments, communications between two Translation Agents (or more precisely, between two TA-mediated devices) can be structured to introduce modifications (e.g. for security) even when using protocols (such as FTP) which are inherently unsecure. Thus TA's capabilities are not limited to securing data in transit. TA's in combination can also implement or enhance security and authentication functions, within the communication architecture, which are virtually impossible to achieve without changes in basic internet standards and/or massive changes in software and servers.

In such embodiments, the TA's which jointly control a communication channel can be programmed to jointly introduce non-standard enhancements to standard protocols.

According to various disclosed embodiments of the present invention, there is provided: A system, comprising: a communications interface module which transmits data over a communication channel according to an addressing protocol which includes one or more reserved addresses which are not freely available for external communication, and also includes non-reserved addresses; at least one active program which sends first communications into said channel through said interface module, using non-reserved addresses, and which also sends second communications to said interface module using ones of said reserved addresses; and an additional module which a) detects ones of said second communications, b) modifies data in ones of said second communications, and c) transmits results of said operation b).

According to various disclosed embodiments of the present invention, there is provided: A system, comprising: a communications interface module which transmits data over a communication channel according to an addressing protocol which includes non-reserved addresses and also one or more reserved loopback addresses which are not freely available for external communication, and which echoes back data addressed to one of said reserved addresses; at least one active program which sends first communications into said channel through said interface module, using non-reserved addresses, and which also sends second communications through said interface module using ones of said reserved loopback addresses; and an additional module which a) detects ones of said second communications, b) modifies data in ones of said second communications, and c) transmits results of said operation b).

According to various disclosed embodiments of the present invention, there A system, comprising: a communications interface module which transmits data over a communication channel according to an addressing protocol which includes one or more reserved addresses which are not freely available for external communication, and also includes non-reserved addresses; at least one active program which sends first communications into said channel through said interface module, using non-reserved addresses, and which also sends second communications through said interface module using ones of said reserved addresses; and an additional module which a) detects ones of said second communications, b) modifies data content portions thereof but not protocol-related header portions thereof, and c) transmits results of said operation b).

According to various disclosed embodiments of the present invention, there is provided: A system, comprising: a communications interface module which transmits data over a communication channel according to an addressing protocol which includes one or more reserved addresses which are not freely available for external communication, and also includes non-reserved addresses; at least one active program which sends first communications into said channel through said interface module, using non-reserved addresses, and which also sends second communications through said interface module using ones of said reserved addresses; and an additional module which a) detects ones of said second communications, b) modifies data in ones of said second communications, and c) transmits results of said operation b); and which also d) intercepts and modifies at least some incoming transmissions directed to said active program.

According to various disclosed embodiments of the present invention, there is provided: A system, comprising: a communications interface module which transmits data over a communication channel according to an addressing protocol which includes one or more reserved addresses which are not freely available for external communication, and also includes non-reserved addresses; at least one active program which sends first communications into said channel through said interface module, using non-reserved addresses, and which also sends second communications through said interface module using ones of said reserved addresses; and an additional module which a) detects ones of said second communications, b) selectively modifies data in only some ones of said second communications, and c) transmits results of said operation b).

According to various disclosed embodiments of the present invention, there is provided: A system, comprising: a communications interface module which transmits data over a communication channel; at least one active program which sends communications into said channel through said interface module; and an additional software module which a) monitors at least some ones of said communications, b) selectively modifies data in only some ones of said second communications, and c) transmits results of said operation b) through said interface module.

According to various disclosed embodiments of the present invention, there is provided: A computer, comprising: a network interface module which transmits and receives data over a communication channel according to an addressing protocol which includes non-reserved addresses and also one or more reserved addresses which are not freely available for external communication; at least one active program, running on a CPU of said computer, which sends first communications into said channel through said interface module, using non-reserved addresses, and which also sends second communications through said interface module using ones of said reserved addresses; and an additional module, running on a CPU of said computer, which a) detects ones of said second communications, b) modifies data in ones of said second communications, and c) transmits results of said operation b).

According to various disclosed embodiments of the present invention, there is provided: A macro-system, comprising: multiple complex systems following respective instruction streams; and at least one network linking said multiple complex systems; wherein multiple ones of said complex systems each comprise: a communications interface module which transmits data over said network according to an addressing protocol which includes non-reserved addresses and also one or more reserved addresses which are not freely available for external communication; at least one active program which sends first communications into said network through said interface module, using non-reserved addresses, and which also sends second communications through said interface module using ones of said reserved addresses; and an additional module which a) detects ones of said second communications, b) processes data in ones of said second communications, and c) transmits results of said operation b).

According to various disclosed embodiments of the present invention, there is provided: A modular expandable software architecture, comprising: an application program which performs at least one class of interface operations by looking up, in a configuration file, a network address which is used for said interface operations; said configuration file containing a reserved address, which does not correspond to any externally routable address, in place of the network address expected by said application program; and a functional module which, when said application program attempts to send data to said reserved address, performs data translation on said data, and retransmits said data, as modified by said data translation, to an externally routable network address.

According to various disclosed embodiments of the present invention, there is provided: A method, comprising the steps of: (a.) from an application program, sending out a packet, which is intended for a real destination, to a first reserved address which cannot correspond to any real destination; and (b.) in a translation program, looking up a second address, corresponding to said real destination in a table in memory, and transforming the data of said packet, and rerouting said packet thereafter to said second address.

According to various disclosed embodiments of the present invention, there is provided: A software structure in a storage medium, comprising instructions which, when activated by at least one processor, will direct the processor to perform operations to implement the method of Claim 42.

According to various disclosed embodiments of the present invention, there is provided: A method for adding a data conversion function to a third-party software program, comprising the steps of: in a configuration file, replacing at least one target address with a respective non-routable address; and adding a functional module which, when the third-party program attempts to send a packet to said reserved address, performs data translation on the content of the packet according to stored algorithms, and retransmits the content, as modified by said data translation, to an externally routable address.

According to various disclosed embodiments of the present invention, there is provided: A method for adding data translation functions to a third-party e-mail program, comprising the steps of: in a configuration file, substituting a reserved address, which does not correspond to any externally routable address, for the correct e-mail upload address; and adding an functional module which, when the e-mail program attempts to send a packet to said reserved address, performs data translation on the content of the packet according to stored algorithms, and retransmits the content to the correct e-mail upload address.

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

The term "network" is used very generally in the present application, to include wireless as well as wired, optical as well as electrical, local area networks (LANs) and wide area networks (WANs), the Internet, and closed networks (such as that used by the banking system).

"TCP/IP" is a network addressing protocol dating back to ARPANET, and now in very wide use. The "IP" addresses used by TCP/IP have the format of four numbers, each less than $2^8$, separated by periods. (Each of these numbers corresponds to two bytes of data, i.e. 8 bits.)

A "packet" is a block of data, in a defined format, which can be routed independently of other packets; standard rules permit a stream of data to be converted to or from packets.

A "port" is a local destination designator: TCP/IP packets include a two-byte port designation in addition to the eight bytes of IP address. Of the 64K possible port designations, a few (mostly within the first 1K) have standard assignments see http://www.faqs.org/ftp/rfc/rfc1340.txt, which is hereby incorporated by reference. For example, port 110 is normally reserved for POP3, 25 for SMTP, 80 for HTTP, and 23 for telnet. (One of these standard assignments is specifically referred to, confusingly, as the "well-known" port.)

A "reserved address" is an address which cannot be routed over the Internet. In TCP/IP these include the loopback addresses discussed above, and a few other blocks of "non-routable" or "unresolvable" addresses (all 10.x.x.x addresses; all 90.x.x.x addresses; 172.16.x.x through 172.31.x.x; and 192.168.x.x).

"Virtual private networks" (VPNs) are network-type communication schemes which embed limited-access constraints within communications over the Internet (or other open or less-secure network). Some common examples of these are referred to as extranets.

A "hub" is a hardware device which echoes packets from one physical network connection into others.

A "router" is a programmable hub which is normally used to echo packets from a local network into the Internet, and vice versa. A router can be programmed, for example, for address-dependent transmission, address translation, port-mapping, and "firewall" and other such higher-level functions.

A "firewall" is a special network interface function which performs authorization checking, refuses unauthorized connections, and may also do address translation, port-mapping packet filtering, and other high-level functions. Firewall functions are commonly integrated with router hardware, but can be implemented separately.

"Packet filtering" is content-dependent routing. Any router performs address-dependent routing, but filtering implies that the data in the packet is analyzed in some fashion to affect routing. (For example, packets in which a virus signature is found may be discarded.)

"Packet sniffing" is an operation which extracts the contents of packets and (possibly depending on contents, addresses or both) saves them elsewhere.

SMTP (Simple Mail Transport Protocol) and POP3 (Post Office Protocol 3) are commonly-used e-mail protocols (one for outgoing, one for incoming). SMTP implementations in which extra functions have been added are sometimes referred to as "ESMTP."

GSM is a cell phone standard—see e. g. http://www.iec.org/online/tutorials/gsm/ and links therein, all of which are hereby incorporated by reference. "SMS" (standard Short Message Protocol) and "GPRS" (Global Packetized Radio Service) are also defined by the GSM standard.

"JVM" is the "Java Virtual Machine" which any Java-capable computer must be able to emulated. That is, Java instructions are assumed to be executed by the Java virtual machine, and any particular computer must be equipped with software drivers to implement the JVM.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Translation Agent modules are capable of being daisy chained for special functions. In a circumstance such as an environment with multiple encryption technologies, a primary TA would receive and interrogate the data. If it found data it could recognize as another encryption technology or a recipient who is configured for receiving in another supported encryption technology, then TA could open a connection using a loopback address and predetermined port and pass then information to that TA processor. The secondary TA would not necessarily know that the information was routed from a primary TA rather than any other TCP/IP stream.

While the invention is particularly advantageous with TCP/IP address protocols, it can also be used with IPX, NetBEUI, NetBIOS, SMB (used for file and print sharing in MS Network) or other protocols, as long as there is a reserved address which can be used for internal communications (intra-chassis or intra-system).

As noted, the disclosed inventions are particularly useful for adding capability to third-party application programs. Some of the programs which are expected to benefit particularly from this are Notes, Eudora, Outlook, Outlook Express, Groupwise, but of course other commercial software packages can also benefit.

An important security benefit is that, in many embodiments, the data translation into a secure format occurs totally inside the system box. This provides an interesting synergy with computers (or other devices) where the CPU itself controls opening of the box, by a "hoodlock" mechanism. (See e.g. U.S. Pat. No. 6,307,738, which is hereby incorporated by reference.) In such cases the TA's resistance to hacking combines advantageously with the hoodlock's protection against physical intrusion.

In an alternative and less preferred class of embodiments, reserved addresses which are not loopback addresses can be used instead. In this case the TA can merely snoop communications, and grab packets which are directed to the particular reserved address(es) it recognizes.

In another alternative and less preferred class of embodiments, addresses can used for TA interception which are not defined as "reserved" within the protocol. In this case the addresses assigned for TA interception must be ones which will not be the target of any legitimate address generated by application software. For example, when Network Address Translation is being used, it is possible to define the rules so that some otherwise-permissible IP addresses should not appear at some points within the network topology. In this case such addresses can be used to define a "hidden call" to a TA routine at a gateway or router. Here too the TA can merely snoop communications, and grab packets which are directed to the particular reserved address(es) it recognizes.

In another alternative and less preferable class of embodiments, the TA can be used in high-speed networks, such as are used in computation clusters or server farms. Here too the disclosed architecture provides a simple way of adding an overlaid structure into an existing network interface architecture. However, in this environment the TA module should of course have a throughput which is high enough not to impose a bottleneck into the communications channel.

Note that multiple different functions can optionally be assigned to different reserved (loopback) addresses: e.g. FTP, locking functions (dongles), secure email, https:, VPN (of whatever configuration) and others can each be assigned to its own loopback address. This allows multiple different routines to be called merely by specifying an appropriate TCP/IP reserved address, or alternatively different routines can each snoop data content of messages sent to some (but not all) of the reserved addresses.

In one alternative class of embodiments, the TA module can include biometric identification functions. In such embodiments the processing performed by the TA module can be made dependent on various authentication components, such as voice recognition, face recognition, input from a portable electronic key, manual entry of a password or PIN, etc. The sensors and interfaces needed for fingerprint or retinal identification are not currently part of a normal personal computer, and the input for facial recognition is not on all computers, so a hardware security module which implements securitization with the TA interface can include dedicated sensor input connections, or even dedicated sensors. For added security these authentications can be combined with required GPS or time relations.

The present application refers to the "TA module" where it is not necessary to specify whether the described functions are implemented in hardware or in software (or both). There are advantages to be gained in either case; an implementation with separate hardware has the potential to be more secure, but is more cumbersome to install.

The disclosed inventions are believed to be particularly advantageous for wireless networks, which are inherently insecure. (Where the intended RF or IR interfaces have omnidirectional antennas, an eavesdropper's the antenna gain is a potential extra margin which can make the insecure area much larger than the useful area.) For similar reasons, the disclosed inventions can be particularly useful for WANs, where extensive signal routing outside the premises may be necessary.

Typically the data sent out onto a network will have originated in a CPU, but in the present application this term is to be construed broadly to cover anything with computing capacity—e.g. a gate array, microcontroller, mainframe, etc.

In one alternative embodiment the TA module can include dedicated routines and/or hardware for video and graphics decompression and buffering, to facilitate handling of streaming video.

Where the disclosed TA is used with a multiprocessor computer, the CPU which is sending communications requests may not be the same one executing translation routines.

References to digital data do not preclude later adaptation of the disclosed innovative teachings to analog or multi-bit data.

One contemplated class of alternatives requires the router/firewall to have packet filtering capability. In this case the router can be programmed so that NO packets go out unless they include (or are preceded by) a signature from the TA. Where this degree of firewall blockade is available, it is not necessary to divert packet addresses coming out of the application; instead the TA can merely snoop outgoing traffic, and retransmit with authentication only packets of translated data, and packets which do not need to be translated.

Additional general background, which helps to show the knowledge of those skilled in the art regarding the system context, and of variations and options for implementations, may be found in the following publications, all of which are hereby incorporated by reference: Mark Nelson, "The Data Compression Book" (2.ed.) (ISBN 1558514341); Gilbert Held, "Personal Computer File Compression" (ISBN 0442017731); Arturo Trujillo, "Translation Machines: Techniques for Machine (ISBN 1852330570); Tim Kientzle, "Internet File Formats" (ISBN 188357756X); Gunter Born, "The File Formats Handbook" (ISBN 1850321175); Bob Quinn and Dave Shute, "Windows Sockets Network Programming" (ISBN 0201633728); Peter Loshin, "Big Book of World Wide Web RFCs" (ISBN 0124558410); Ralph Droms, "DHCP (Dynamic Host Configuration Protocol)" (ISBN 1578701376); and Eric Hall, "Internet Core Protocols—The Definitive Guide" (ISBN 1565925726).

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle. Moreover, the claims filed with this application are intended to be as comprehensive as possible: EVERY novel and nonobvious disclosed invention is intended to be covered, and NO subject matter is being intentionally abandoned, disclaimed, or dedicated.

What is claimed is:

1. A system, comprising:
    a communications interface module which
        transmits data over a communication channel
        according to an addressing protocol which includes one or more reserved addresses which are not freely available for external communication, and also includes non-reserved addresses;
    at least one active program which
        sends first communications into said channel through said interface module, using non-reserved addresses, and which
        also sends second communications through said interface module using ones of said reserved addresses; and
    an additional module which
        a) detects ones of said second communications,
        b) modifies data in ones of said second communications, and
        c) transmits results of said operation b);
    wherein said operations a), b), and c) by said additional module are transparent to said active program.

2. The system of claim 1, wherein said additional module is a software module.

3. The system of claim 1, wherein said additional module is a software module, running on the same processor as said active program.

4. The system of claim 1, wherein said protocol is TCP/IP.

5. The system of claim 1, wherein said additional module transmits results of said operation b) through said interface module to a non-reserved address.

6. The system of claim 1, wherein said additional module separates protocol-related header portions of said transmission from data content portions thereof, and performs data translation operations on said data content portions without operating on said header portions.

7. The system of claim 1, wherein said processing step b) is performed only conditionally, in dependence on information in the header of the transmission as received.

8. The system of claim 1, wherein said modification includes data compression.

9. The system of claim 1, wherein said modification includes data hashing.

10. The system of claim 1, wherein said modification includes data encryption and decryption.

11. The system of claim 1, wherein said modification includes data filtering.

12. The system of claim 1, wherein said modification includes digital signature and identification.

13. The system of claim 1, wherein said modification includes interfacing to software programs.

14. The system of claim 1, wherein said modification includes dongles.

15. A system, comprising:
    a communications interface module which
        transmits data over a communication channel
        according to an addressing protocol which includes non-reserved addresses and also one or more reserved loopback addresses which are not freely available for external communication, and
        which echoes back data addressed to one of said reserved addresses;
    at least one active program which
        sends first communications into said channel through said interface module, using non-reserved addresses, and which
        also sends second communications through said interface module using ones of said reserved loopback addresses; and
    an additional module which
        a) detects ones of said second communications,
        b) modifies data in ones of said second communications, and
        c) transmits results of said operation b);
    wherein said operations a), b), and c) by said additional module are transparent to said active program.

16. The system of claim 15, wherein said additional module is a software module.

17. The system of claim 15, wherein said protocol is TCP/IP.

18. The system of claim 15, wherein said additional module transmits results of said operation b) through said interface module to a non-reserved address.

19. The system of claim 15, wherein said processing step b) is performed only conditionally, in dependence on information in the header of the transmission as received.

20. The system of claim 15, wherein said additional module separates protocol-related header portions of said transmission from data content portions thereof, and performs data translation operations on said data content portions without operating on said header portions.

21. The system of claim 15, wherein said modification includes data compression.

22. The system of claim 15, wherein said modification includes data hashing.

23. The system of claim 15, wherein said modification includes data encryption and decryption.

24. The system of claim 15, wherein said modification includes data filtering.

25. The system of claim 15, wherein said modification includes digital signature and identification.

26. The system of claim 15, wherein said modification includes interfacing to software programs.

27. The system of claim 15, wherein said modification includes dongles.

28. A system, comprising:
a communications interface module which
transmits data over a communication channel
according to an addressing protocol which includes one or more reserved addresses which are not freely available for external communication, and also includes non-reserved addresses;
at least one active program which
sends first communications into said channel through said interface module, using non-reserved addresses, and which
also sends second communications through said interface module using ones of said reserved addresses; and
an additional module which
a) detects ones of said second communications,
b) modifies data content portions thereof but not protocol-related header portions thereof, and
c) transmits results of said operation b);
wherein said operations a), b), and c) by said additional module are transparent to said active program.

29. The system of claim 28, wherein said additional module is a software module.

30. The system of claim 28, wherein said additional module is a software module, running on the same processor as said active program.

31. The system of claim 28, wherein said additional module separates protocol-related header portions of said transmission from data content portions thereof, and performs data translation operations on said data content portions without operating on said header portions.

32. The system of claim 28, wherein said protocol is TCP/IP.

33. The system of claim 28, wherein said additional module transmits results of said operation b) through said interface module to a non-reserved address.

34. The system of claim 28, wherein said processing step b) is performed only conditionally, in dependence on information in the header and/or content of the transmission as received.

35. The system of claim 28, wherein said modification includes data compression.

36. The system of claim 28, wherein said modification includes data hashing.

37. The system of claim 28, wherein said modification includes data encryption and decryption.

38. The system of claim 28, wherein said modification includes data filtering.

39. The system of claim 28, wherein said modification includes digital signature and identification.

40. The system of claim 28, wherein said modification includes interfacing to software programs.

41. The system of claim 28, wherein said modification includes dongles.

42. A system, comprising:
a communications interface module which
transmits data over a communication channel
according to an addressing protocol which includes one or more reserved addresses which are not freely available for external communication, and also includes non-reserved addresses;
at least one active program which
sends first communications into said channel through said interface module, using non-reserved addresses, and which
also sends second communications through said interface module using ones of said reserved addresses; and
an additional module which
a) detects ones of said second communications,
b) modifies data in ones of said second communications, and
c) transmits results of said operation b); and which also
d) intercepts and modifies at least some incoming transmissions directed to said active program;
wherein said operations a), b), and c) by said additional module are transparent to said active program.

43. The system of claim 42, wherein said additional module is a software module.

44. The system of claim 42, wherein said additional module is a software module, running on the same processor as said active program.

45. The system of claim 42, wherein said protocol is TCP/IP.

46. The system of claim 42, wherein said additional module transmits results of said operation b) through said interface module to a non-reserved address.

47. The system of claim 42, wherein said processing step b) is performed only conditionally.

48. The system of claim 42, wherein said processing step d) is performed only conditionally, in dependence on information in the content of the transmission as received.

49. The system of claim 42, wherein said additional module separates protocol-related header portions of said transmission from data content portions thereof, and performs data translation operations on said data content portions without operating on said header portions.

50. The system of claim 42, wherein said modification includes data compression.

51. The system of claim 42, wherein said modification includes data hashing.

52. The system of claim 42, wherein said modification includes data encryption and decryption.

53. The system of claim 42, wherein said modification includes data filtering.

54. The system of claim 42, wherein said modification includes digital signature and identification.

55. The system of claim 42, wherein said modification includes interfacing to software programs.

56. The system of claim 42, wherein said modification includes dongles.

57. A system, comprising:
a communications interface module which
transmits data over a communication channel
according to an addressing protocol which includes one or more reserved addresses which are not freely available for external communication, and also includes non-reserved addresses;
at least one active program which
sends first communications into said channel through said interface module, using non-reserved addresses, and which
also sends second communications through said interface module using ones of said reserved addresses; and
an additional module which
a) detects ones of said second communications,
b) selectively modifies data in only some ones of said second communications, and
c) transmits results of said operation b);
wherein said operations a), b), and c) by said additional module are transparent to said active program.

58. The system of claim 57, wherein said additional module is a software module.

59. The system of claim 57, wherein said additional module is a software module, running on the same processor as said active program.

60. The system of claim 57, wherein said protocol is TCP/IP.

61. The system of claim 57, wherein said additional module transmits results of said operation b) through said interface module to a non-reserved address.

62. The system of claim 57, wherein said processing step b) is performed only conditionally.

63. The system of claim 57, wherein said processing step b) is performed only conditionally, in dependence on information in the content of the transmission as received.

64. The system of claim 57, wherein said modification includes data compression.

65. The system of claim 57, wherein said modification includes data hashing.

66. The system of claim 57, wherein said modification includes data encryption and decryption.

67. The system of claim 57, wherein said modification includes data filtering.

68. The system of claim 57, wherein said modification includes digital signature and identification.

69. The system of claim 57, wherein said modification includes interfacing to software programs.

70. The system of claim 57, wherein said modification includes dongles.

71. A computer, comprising:
a network interface module which
transmits and receives data over a communication channel
according to an addressing protocol which includes non-reserved addresses and also one or more reserved addresses which are not freely available for external communication;
at least one active program, running on a CPU of said computer, which
sends first communications into said channel through said interface module, using non-reserved addresses, and which
also sends second communications through said interface module using ones of said reserved addresses; and
an additional module, running on a CPU of said computer, which
a) detects ones of said second communications,
b) modifies data in ones of said second communications, and
c) transmits results of said operation b);
wherein said operations a), b), and c) by said additional module are transparent to said active program.

72. The computer of claim 71, wherein said additional module is a software module.

73. The computer of claim 71, wherein said additional module is a software module, and is running on the same hardware as said active program.

74. The computer of claim 71, wherein said modification includes data compression.

75. The computer of claim 71, wherein said modification includes data hashing.

76. The computer of claim 71, wherein said modification includes data encryption and decryption.

77. The computer of claim 71, wherein said modification includes data filtering.

78. The computer of claim 71, wherein said modification includes digital signature and identification.

79. The computer of claim 71, wherein said modification includes interfacing to software programs.

80. The computer of claim 71, wherein said modification includes dongles.

81. A macro-system, comprising:
multiple complex systems executing respective instruction streams; and
at least one network linking said multiple complex systems;
wherein multiple ones of said complex systems each comprise:
a communications interface module which transmits data over said network according to an addressing protocol which includes non-reserved addresses and also one or more reserved addresses which are not freely available for external communication;
at least one active program which sends first communications into said network through said interface module, using non-reserved addresses, and which also sends second communications through said interface module using ones of said reserved addresses; and
an additional module which
a) detects ones of said second communications,
b) transforming data in ones of said second communications, and
c) transmits results of said operation b);
wherein said operations a), b), and c) by said additional module are transparent to said active program.

82. The macro-system of claim 81, wherein said additional module is a software module.

83. The macro-system of claim 81, wherein said additional module is a software module, and is running on the same hardware as said active program.

84. The macro-system of claim 81, wherein said additional module separates protocol-related header portions of said transmission from data content portions thereof, and performs data translation operations on said data content portions without operating on said header portions.

85. The macro-system of claim 81, wherein said processing includes data compression.

86. The macro-system of claim 81, wherein said processing includes data hashing.

87. The macro-system of claim 81, wherein said processing includes data encryption and decryption.

88. The macro-system of claim 81, wherein said processing includes data filtering.

89. The macro-system of claim 81, wherein said processing includes digital signature and identification.

90. The macro-system of claim 81, wherein said processing includes interfacing to software programs.

91. A modular expandable software architecture stored in a storage medium, comprising:
   an application program which performs at least one class of interface operations by looking up, in a configuration file, a network address which is used for said interface operations;
   said configuration file containing a reserved address, which does not correspond to any externally routable address, in place of the network address expected by said application program; and
   a functional module which, when said application program attempts to send data to said reserved address, performs data translation on said data, and
      retransmits said data, as modified by said data translation, to an externally routable network address;
   wherein said operations by said functional module are transparent to said active program.

92. The architecture of claim 91, wherein said module is a software module.

93. The architecture of claim 91, wherein said module is a software module, and is running on the same hardware as said active program.

94. The architecture of claim 91, wherein said translation includes data compression.

95. The architecture of claim 91, wherein said translation includes data hashing.

96. The architecture of claim 91, wherein said translation includes data encryption and decryption.

97. The architecture of claim 91, wherein said translation includes data filtering.

98. The architecture of claim 91, wherein said translation includes digital signature and identification.

99. The architecture of claim 91, wherein said translation includes interfacing to software programs.

100. A method, comprising the steps of:
   (a.) from an application program, sending out a packet, which is intended for a real destination, to a first reserved address which cannot correspond to any real destination; and
   (b.) in a translation program,
      looking up a second address, corresponding to said real destination in a table in memory, and
      transforming the data of said packet, and
      rerouting said packet thereafter to said second address;
      wherein said operations by said translation program are transparent to said application program.

101. A software structure in a storage medium, comprising instructions which, when activated by at least one processor, will direct the processor to perform operations to implement the method of claim 100.

102. The method of claim 100, wherein said transformation includes data compression.

103. The method of claim 100, wherein said transformation includes data hashing.

104. The method of claim 100, wherein said transformation includes data encryption and decryption.

105. The method of claim 100, wherein said transformation includes data filtering.

106. The method of claim 100, wherein said transformation includes digital signature and identification.

107. The method of claim 100, wherein said transformation includes interfacing to software programs.

108. The method of claim 100, wherein said transformation includes dongles.

109. A method for adding a data conversion function to a third-party software program, comprising the steps of:
   in a configuration file, replacing at least one target address with a respective non-routable address; and
   adding a functional module which,
      when the third-party program attempts to send a packet to said non-routable address,
      performs data translation on the content of the packet according to stored algorithms, and
      retransmits the content, as modified by said data translation, to an externally routable address;
      wherein said operations by said functional module are transparent to said third-party software program.

110. A software structure in a storage medium, comprising instructions which, when activated by at least one processor, will direct the processor to perform operations to implement the method of claim 109.

111. A method for adding data translation functions to a third-party e-mail program, comprising the steps of:
   in a configuration file, substituting a reserved address, which does not correspond to any externally routable address, for a correct e-mail upload address; and
   adding a functional module which,
      when the e-mail program attempts to send a packet to said reserved address,
      performs data translation on the content of the packet according to stored algorithms, and
      retransmits the translated content to the correct e-mail upload address;
      wherein said operations by said functional module are transparent to said third-party software program.

112. A software structure in a storage medium, comprising instructions which, when activated by at least one processor, will direct the processor to perform operations to implement the method of claim 111.

* * * * *